US012588081B2

(12) United States Patent
Selvaganapathy et al.

(10) Patent No.: US 12,588,081 B2
(45) Date of Patent: Mar. 24, 2026

(54) CARRIER SPECIFIC APERIODIC GAP FOR CAPABILITY SHARING FOR MUSIM OPERATION FOR DUAL TX/RX DEVICE

(71) Applicant: Nokia Technologies Oy, Espoo (FI)

(72) Inventors: Srinivasan Selvaganapathy, Bangalore (IN); Faranaz Sabouri-Sichani, Aalborg (DK); Laura Luque Sanchez, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 341 days.

(21) Appl. No.: 18/355,968

(22) Filed: Jul. 20, 2023

(65) Prior Publication Data

US 2024/0080914 A1     Mar. 7, 2024

(30) Foreign Application Priority Data

Jul. 27, 2022     (IN) .............................. 202241043051

(51) Int. Cl.
*H04W 8/18* (2009.01)
*H04W 8/24* (2009.01)
*H04W 76/10* (2018.01)
*H04W 88/06* (2009.01)

(52) U.S. Cl.
CPC ............. *H04W 76/10* (2018.02); *H04W 8/24* (2013.01); *H04W 88/06* (2013.01)

(58) Field of Classification Search
CPC ....... H04W 76/10; H04W 8/24; H04W 88/06; H04W 8/183; H04W 76/20; H04W 76/15
See application file for complete search history.

(56) References Cited

U.S. PATENT DOCUMENTS

| | | | |
|---|---|---|---|
| 2021/0120524 A1* | 4/2021 | Palle | H04W 68/005 |
| 2022/0053448 A1 | 2/2022 | Velev et al. | |
| 2022/0072175 A1* | 3/2022 | Lovlekar | A61L 2/22 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.
"New WID on Dual Tx/Rx MUSIM", 3GPP TSG RAN Meeting #94e, RP-212716, Agenda: 8.A1, RAN2 VC, Dec. 6-17, 2021, 4 pages.

(Continued)

*Primary Examiner* — Joseph E Dean, Jr.
(74) *Attorney, Agent, or Firm* — Lippes Mathias LLP

(57)     ABSTRACT

In accordance with example embodiments of the invention there is disclosed receiving, with a first multi universal subscriber identity module (MUSIM) of more than one MUSIM of a first user equipment of a first network, a connection request from a second user equipment of a second network, sending or receiving, with or from the MUSIM of the first user equipment towards a network node of the first network, assistance information comprising an indication that the first user equipment needs to leave one carrier of the first network for a MUSIM operation, and in response to the assistance information, receiving from or sending by the network node of the first network, a gap configuration for a MUSIM operation; and based thereon, sending or receiving the gap configuration towards the second user equipment for use by the second user equipment to establish a radio resource control connection with the second network.

14 Claims, 4 Drawing Sheets

(56) References Cited

OTHER PUBLICATIONS

"Msc-generator", Sourceforge, Retrieved on Aug. 17, 2023, Webpage available at : https://sourceforge.net/projects/msc-generator/.

"Additional scenarios for MUSIM operation for Dual TX/RX UE", 3GPP TSG-RAN WG2 Meeting #121, R2-2300923, Agenda: 8.17. 2, Nokia, Feb. 27-Mar. 3, 2022, 4 pages.

Extended European Search Report received for corresponding European Patent Application No. 23187809.1, dated Dec. 22, 2023, 12 pages.

"Open issues on network switching for Multi-USIM devices", 3GPP TSG-RAN WG2 Meeting #114-e, R2-2105437, Agenda: 8.3.3, Samsung, May 17-29, 2021, 4 pages.

"[AT118-e][232][ MUSIM] Corrections to MUSIM gap configuration aspects", 3GPP TSG-RAN WG2 Meeting #118-e, R2-2206171, Agenda: 6.3.3, Qualcomm Incorporated, May 9-20, 2022, 32 pages.

* cited by examiner

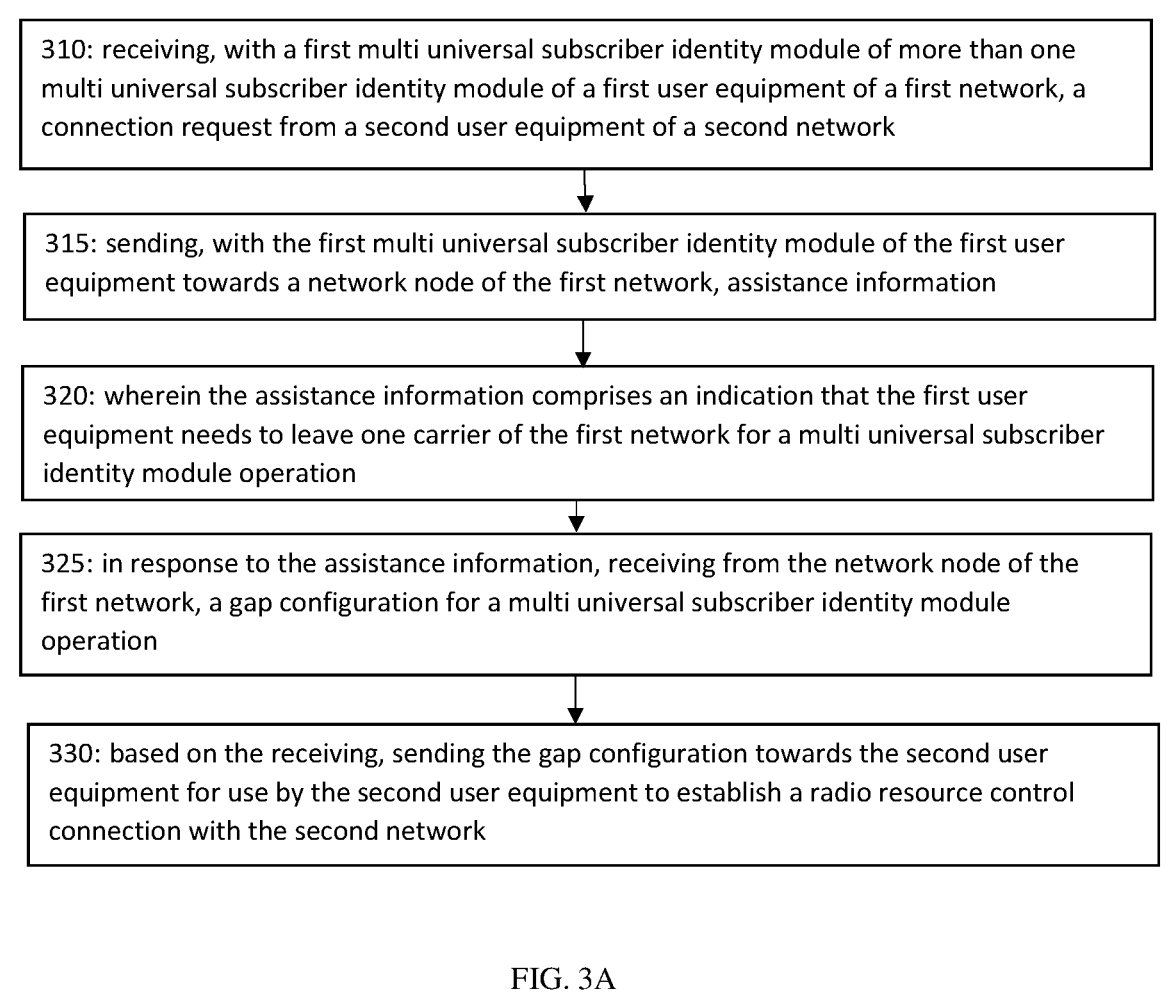

310: receiving, with a first multi universal subscriber identity module of more than one multi universal subscriber identity module of a first user equipment of a first network, a connection request from a second user equipment of a second network 315: sending, with the first multi universal subscriber identity module of the first user equipment towards a network node of the first network, assistance information 320: wherein the assistance information comprises an indication that the first user equipment needs to leave one carrier of the first network for a multi universal subscriber identity module operation 325: in response to the assistance information, receiving from the network node of the first network, a gap configuration for a multi universal subscriber identity module operation 330: based on the receiving, sending the gap configuration towards the second user equipment for use by the second user equipment to establish a radio resource control connection with the second network

FIG. 3A

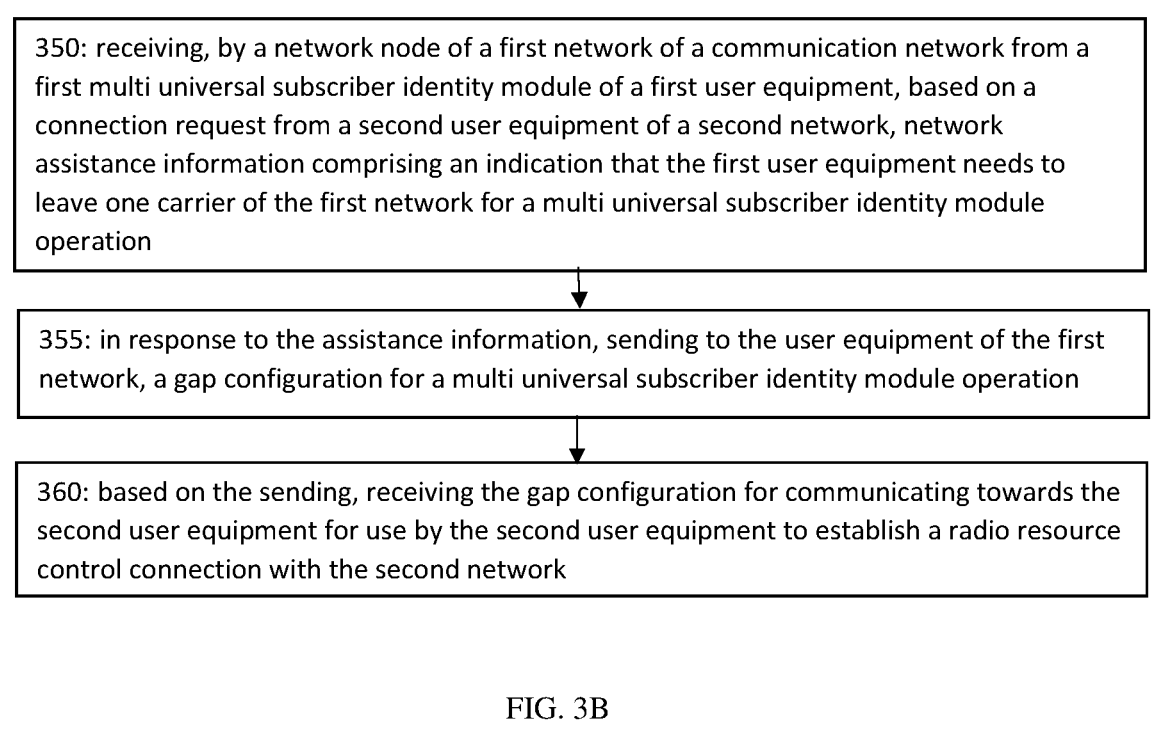

350: receiving, by a network node of a first network of a communication network from a first multi universal subscriber identity module of a first user equipment, based on a connection request from a second user equipment of a second network, network assistance information comprising an indication that the first user equipment needs to leave one carrier of the first network for a multi universal subscriber identity module operation 355: in response to the assistance information, sending to the user equipment of the first network, a gap configuration for a multi universal subscriber identity module operation 360: based on the sending, receiving the gap configuration for communicating towards the second user equipment for use by the second user equipment to establish a radio resource control connection with the second network

FIG. 3B

CARRIER SPECIFIC APERIODIC GAP FOR CAPABILITY SHARING FOR MUSIM OPERATION FOR DUAL TX/RX DEVICE

CROSS REFERENCE TO RELATED APPLICATION

This application claims the benefit of Indian provisional application No. 202241043051 filed 27 Jul. 2022, which is incorporated herein by reference in its entirety.

TECHNICAL FIELD

The teachings in accordance with the exemplary embodiments of this invention relate generally to a connection setup procedure in NTWK-B while having active connection in NTWK-A and, more specifically, relate to a combination of aperiodic gap for capability sharing along with static capability reduction for a connection setup procedure in NTWK-B while having active connection in NTWK-A to at least improve connection procedures for MUSIM operations.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

CA Carrier Aggregation
DC Dual Connectivity
MUSIM Multi Universal Subscriber Identity Module
NTWK Network
PS Packet Switched
RACH Random Access Channel
RRC Radio Resource Control
Rx Receiver
TDM Time Division Multiplexing
Tx Transmitter
UAI Assistance Information
UE User Equipment
USIM Universal Subscriber Identity Module In the context of 3GPP support for MUSIM devices a new work item is approved in standards at the time of this application to enhance support of MUSIM operation for dualRX/dualTX devices where both USIM can be in RRC CONNECTED mode. A MUSIM device or a MUSIM terminal is associated with multiple subscriptions. The MUSIM device or the MUSIM terminal is communicating with a first network via a first subscription of the multiple subscriptions and communicating with a second network via a second subscription of the multiple subscriptions. The objectives of the work item areas are as follows.

Enhancements for MUSIM procedures to operate in RRC_CONNECTED state simultaneously in NTWK-A and NTWK-B. [RAN2, RAN3, RAN4]:

Specify mechanism to indicate preference on temporary UE capability restriction and removal of restriction (e.g. capability update, release of cells, (de)activation of configured resources) with NTWK-A when UE needs transmission or reception (e.g., start/stop connection to NTWK-B) for MUSIM purpose;

RAT Concurrency: Network A is NR SA (with CA) or NR DC. Network B can either be LTE or NR; and Applicable UE architecture: Dual-RX/Dual-TX UE.

Example embodiments of this invention proposes a new combination of capability sharing gapping along with static capability reduction operations to at least improve connection procedures for said MUSIM operations.

SUMMARY

This section contains examples of possible implementations and is not meant to be limiting.

In an example aspect of the invention, there is an apparatus, such as a user equipment side apparatus, comprising: at least one processor; and at least one memory including computer program code, where the at least one memory and the computer program code are configured, with the at least one processor, to cause the apparatus to perform: receiving, with a first multi universal subscriber identity module of more than one multi universal subscriber identity module of a first user equipment of a first network, a connection request from a second user equipment of a second network; sending, with the first multi universal subscriber identity module of the first user equipment towards a network node of the first network, assistance information; wherein the assistance information comprises an indication that the first user equipment needs to leave one carrier of the first network for a multi universal subscriber identity module operation; in response to the assistance information, receiving from the network node of the first network, a gap configuration for a multi universal subscriber identity module operation; and based on the receiving, sending the gap configuration towards the second user equipment for use by the second user equipment to establish a radio resource control connection with the second network.

In still another example aspect of the invention, there is a method comprising: receiving, with a first multi universal subscriber identity module of more than one multi universal subscriber identity module of a first user equipment of a first network, a connection request from a second user equipment of a second network; sending, with the first multi universal subscriber identity module of the first user equipment towards a network node of the first network, assistance information; wherein the assistance information comprises an indication that the first user equipment needs to leave one carrier of the first network for a multi universal subscriber identity module operation; in response to the assistance information, receiving from the network node of the first network, a gap configuration for a multi universal subscriber identity module operation; and based on the receiving, sending the gap configuration towards the second user equipment for use by the second user equipment to establish a radio resource control connection with the second network.

A further example embodiment is an apparatus and a method comprising the apparatus and the method of the previous paragraphs, wherein the assistance information further comprises a list of capability restrictions of the first user equipment in order of preference, wherein the first user equipment is the associated with a plurality of subscriptions; there is communicating with the first network via a first subscription of the plurality of subscriptions and communicating with the second network via a second subscription of the plurality of subscriptions, wherein the list of the capability restrictions comprises at least one of a list of carriers that can be released or gaps that can be created ordered by preference, wherein the order of preference is based on preference of capability update, release of cells, and activation or deactivation of configured resources for the connection request, wherein the assistance information indicates a need for capability restrictions and is requesting a periodic gap or an aperiodic gap to the first network based on the connection request, wherein the assistance information further comprises a request for at least one periodic gap or at least one aperiodic gap to the first network based on the connection request, wherein there is receiving from the first network a radio resource control reconfiguration indicating a secondary cell release, wherein the radio resource control reconfiguration comprises at least one of a timer or conditions for addition of the secondary cell, wherein a conditional configuration is linked to timer expiry to add the secondary cell back, wherein the first user equipment is in a radio resource control connected state with at least one primary secondary cell of at least one secondary cell group of the first network, wherein the first user equipment has a radio resource control connection using more than one component carrier with secondary cells of the first network, wherein the second user equipment is in a radio resource control idle or inactive state with the second network, wherein the gap configuration is configuring at least one periodic gap or at least one aperiodic gap used for capability sharing between the first network and the second network on at least one specific secondary carrier for multi-band operation, wherein the gap configuration is configuring one or more periodic gaps or one or more aperiodic gaps used for capability sharing between the first network and the second network on at least one secondary carrier for multi-band operation, and wherein the gap configuration is received in a radio resource control reconfiguration message from the first network, wherein the gap configuration is carrier specific for the dual connectivity, wherein the gap configuration comprises a gap for multi-band operation capability sharing on the at least one specific secondary carrier, and wherein based on the gap configuration the user equipment is capable of operating with two transmit or receive chains towards the network ensuring that for the specific secondary carrier the chain is activated as per the received gap configuration and user equipment one of releases or suspend all operation on the specific secondary carrier where gap was configured, wherein there is determining a capability of the list of capability restrictions is met in a gap duration of the gap configuration based on all carriers in the gap being within a maximum limit with a reduced number of carriers in the gap duration, wherein the user equipment needs to leave the one carrier of the first network to initiate random access channel access on at least one specific secondary carrier for the multi universal subscriber identity module operation, wherein based on the gap configuration the first user equipment is switched by the second network to a different carrier of the second network over which the first user equipment establishes a radio resource control connection with the second network, wherein the different carrier is released in the first network, and wherein the switch and release is indicated to the first user equipment by the second user equipment, wherein there is triggering by the first multi universal subscriber identity module, sending information comprising a release preference towards the first network, wherein the information comprises an indication of the different carrier, a number of cells, and a list of secondary cells to be released in order of preference, wherein the gap configuration comprises a timer value for duration of absence or restriction for the connection in the first network, and/or wherein there is receiving from the first network a radio resource control reconfiguration indicating the different carrier is released in the first network.

A non-transitory computer-readable medium storing program code, the program code executed by at least one processor to perform at least the method as described in the paragraphs above.

In yet another example aspect of the invention, there is an apparatus comprising: means for receiving, with a first multi universal subscriber identity module of more than one multi universal subscriber identity module of a first user equipment of a first network, a connection request from a second user equipment of a second network, means for sending, with the first multi universal subscriber identity module of the first user equipment towards a network node of the first network, assistance information, wherein the assistance information comprises an indication that the first user equipment needs to leave one carrier of the first network for a multi universal subscriber identity module operation, means, in response to the assistance information, for receiving from the network node of the first network, a gap configuration for a multi universal subscriber identity module operation; and means, based on the receiving, for sending the gap configuration towards the second user equipment for use by the second user equipment to establish a radio resource control connection with the second network.

In accordance with the example embodiments as described in the paragraph above, at least the means for receiving, leaving, and sending comprises a network interface, and computer program code stored on a computer-readable medium and executed by at least one processor.

In an example aspect of the invention, there is an apparatus, such as a network side apparatus, comprising: at least one processor; and at least one memory including computer program code, where the at least one memory and the computer program code are configured, with the at least one processor, to cause the apparatus to perform: receiving, by a network node of a first network of a communication network from a first multi universal subscriber identity module of a first user equipment, based on a connection request from a second user equipment of a second network, network assistance information comprising an indication that the first user equipment needs to leave one carrier of the first network for a multi universal subscriber identity module operation; in response to the assistance information, sending to the user equipment of the first network, a gap configuration for a multi universal subscriber identity module operation; and based on the sending, receiving the gap configuration for communicating towards the second user equipment for use by the second user equipment to establish a radio resource control connection with the second network.

In still another example aspect of the invention, there is a method comprising: receiving, by a network node of a first network of a communication network from a first multi universal subscriber identity module of a first user equipment, based on a connection request from a second user equipment of a second network, network assistance information comprising an indication that the first user equipment needs to leave one carrier of the first network for a multi universal subscriber identity module operation; in response to the assistance information, sending to the user equipment of the first network, a gap configuration for a multi universal subscriber identity module operation; and based on the sending, receiving the gap configuration for communicating towards the second user equipment for use by the second user equipment to establish a radio resource control connection with the second network.

A further example embodiment is an apparatus and a method comprising the apparatus and the method of the previous paragraphs, wherein the assistance information further comprises a list of capability restrictions of the first user equipment in order of preference, wherein the first user equipment is the associated with a plurality of subscriptions for communicating with the first network and communicating with the second network via a second subscription of the plurality of subscriptions, wherein the list of the capability restrictions comprises at least one of a list of carriers that can be released or gaps that can be created ordered by preference, wherein the order of preference is based on preference of capability update, release of cells, and activation or deactivation of configured resources for the connection request, wherein the assistance information indicates a need for capability restrictions and is requesting a periodic gap or an aperiodic gap to the first network based on the connection request, wherein the assistance information further comprises a request for at least one periodic gap or at least one aperiodic gap to the first network based on the connection request, wherein there is receiving from the first network a radio resource control reconfiguration indicating a secondary cell release, wherein the radio resource control reconfiguration comprises at least one of a timer or conditions for addition of the secondary cell, wherein a conditional configuration is linked to timer expiry to add the secondary cell back, wherein the first user equipment has a radio resource control connection using more than one component carrier with secondary cells of the first network, wherein the gap configuration is configuring at least one periodic gap or at least one aperiodic gap used for capability sharing between the first network and the second network on at least one specific secondary carrier for multi-band operation, wherein the gap configuration is configuring one or more periodic gaps or one or more aperiodic gaps used for capability sharing between the first network and the second network on at least one secondary carrier for multi-band operation, and wherein the gap configuration is received in a radio resource control reconfiguration message from the first network, wherein the gap configuration is carrier specific for the dual connectivity, wherein the gap configuration comprises a gap for multi-band operation capability sharing on the at least one specific secondary carrier, and wherein based on the gap configuration the user equipment is capable of operating with two transmit or receive chains towards the network ensuring that for the specific secondary carrier the chain is activated as per the received gap configuration and user equipment one of releases or suspend all operation on the specific secondary carrier where gap was configured, wherein the gap configuration caused the first user equipment to determine a capability of the list of capability restrictions is met in a gap duration of the gap configuration based on all carriers in the gap being within a maximum limit with a reduced number of carriers in the gap duration, and wherein the gap configuration causes the first user equipment to leave the one carrier of the first network to initiate random access channel access on at least one specific secondary carrier for the multi universal subscriber identity module operation, wherein based on the gap configuration the first user equipment is switched by the second network to a different carrier of the second network over which the first user equipment establishes a radio resource control connection with the second network, wherein the different carrier is released in the first network, and wherein the switch and release is indicated to the first user equipment by the second user equipment, wherein there is receiving from the first multi universal subscriber identity module of the first user equipment, information comprising a release preference, wherein the information comprises an indication of the different carrier, a number of cells, and a list of secondary cells to be released in order of preference, wherein the gap configuration comprises a timer value for duration of absence or restriction for the connection in the first network, and/or wherein there is sending towards the first user equipment a radio resource control reconfiguration indicating the different carrier is released in the first network.

A non-transitory computer-readable medium storing program code, the program code executed by at least one processor to perform at least the method as described in the paragraphs above.

In yet another example aspect of the invention, there is an apparatus comprising: means for receiving, by a network node of a first network of a communication network from a first multi universal subscriber identity module of a first user equipment, based on a connection request from a second user equipment of a second network, network assistance information comprising an indication that the first user equipment needs to leave one carrier of the first network for a multi universal subscriber identity module operation; means in response to the assistance information, for sending to the user equipment of the first network, a gap configuration for a multi universal subscriber identity module operation; and means, based on the sending, for receiving the gap configuration for communicating towards the second user equipment for use by the second user equipment to establish a radio resource control connection with the second network.

In accordance with the example embodiments as described in the paragraph above, at least the means for receiving and sending comprises a network interface, and computer program code stored on a computer-readable medium and executed by at least one processor.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 3A and FIG. 3B each show a method in accordance with example embodiments of the invention which may be performed by an apparatus.

DETAILED DESCRIPTION

Figure 1:
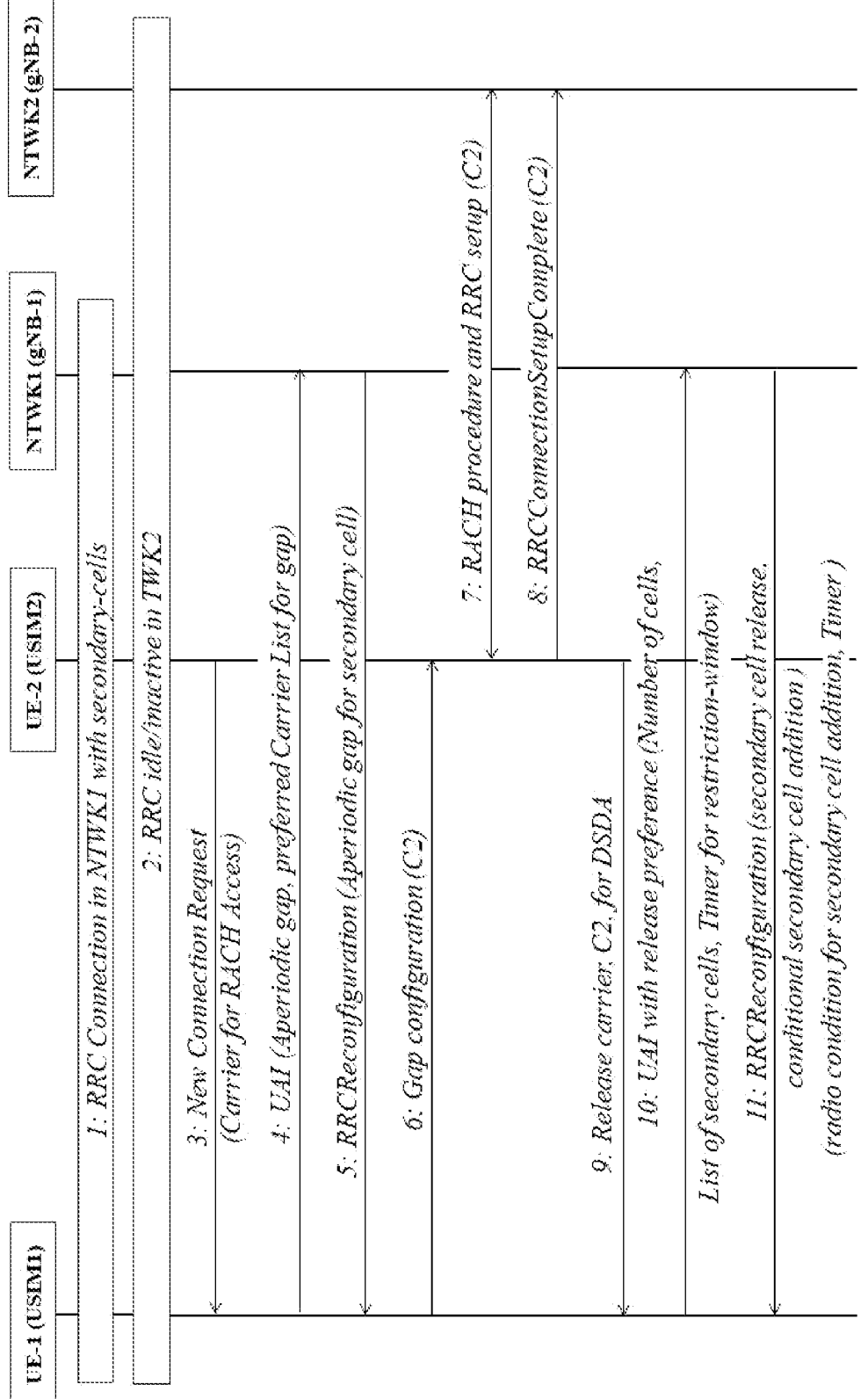
FIG. 1 shows a Message Chart Sequence to illustrating example embodiments of the invention.

In example embodiments of this invention there is proposed at least a combination of aperiodic gap for capability sharing along with static capability reduction for a connection setup procedure in NTWK-B while having active connection in NTWK-A to at least improve connection procedures for MUSIM operations.

As similarly stated above, example embodiments of this invention propose combination of aperiodic gap for capability sharing along with static capability reduction for improving connection procedures for said MUSIM operations including a connection setup procedure in NTWK-B while having active connection in NTWK-A.

Problems

Scenario 1:

UE is in RRC CONNECTED mode in NTWK-A with N number of carriers configured for its operation (Example (C1-C4 in band X);

UE wants to setup RRC connection in NTWK-B which means attempting for RACH access on specific carrier in the operating band of NTWK-B. (C5 in band Y); and Simultaneous RACH operation on NTWK-B carrier and NTWK-A operation with CA is not possible as per UE capability for multi-band operation In this scenario 1, during RACH access, NTWK-A may need to release specific carrier from C1-C4 to allow the inter-band combination supported by MUSIM UE. Later if NTWK-B switches the connection to different carrier than C5, NTWK-A may need to release different carrier. This will require signalling procedure for secondary cell release/addition to happen multiple times when RRC connection is setup in NTWK-B followed by the UE moved to specific carrier. This scenario is possible for deployment having RACH resources only configured in primary cell and UEs are moved to different carriers for load balancing after connection setup.

Scenario 2:

UE is in RRC CONNECTED mode in NTWK-A with N number of carriers configured for its operation; and UE in NTWK-B is in RRC-IDLE mode but operating in band which conflicts with current CA operation at NTWK-A.

In this scenario 2, it can be seen that a simple solution is to release one of the carriers which have conflict to continue with NTWK-B operation by reducing UEs CA capability. However, this will lead to fixed reduction in throughput to the ongoing active connection. Therefore, an alternative means for capability sharing are needed in this scenario. Moreover additional signalling will be needed to add the carrier again after the short signalling.

Reducing UEs capability to "divide" resources across two USIM is known. However, the proposal in accordance with example embodiments of this invention is not on capability reduction but enhancement of Release 17 NTWK switching such that the switching without RRC connection leave is applied only to one carrier or cell group and is not present in prior art according to the inventors' knowledge.

In accordance with example embodiments of the invention there are New Methods including a combination of aperiodic gap for capability sharing and static capability reduction for improving connection procedures for said MUSIM operations including a connection setup procedure in NTWK-B while having active connection in NTWK-A.

Figure 2:
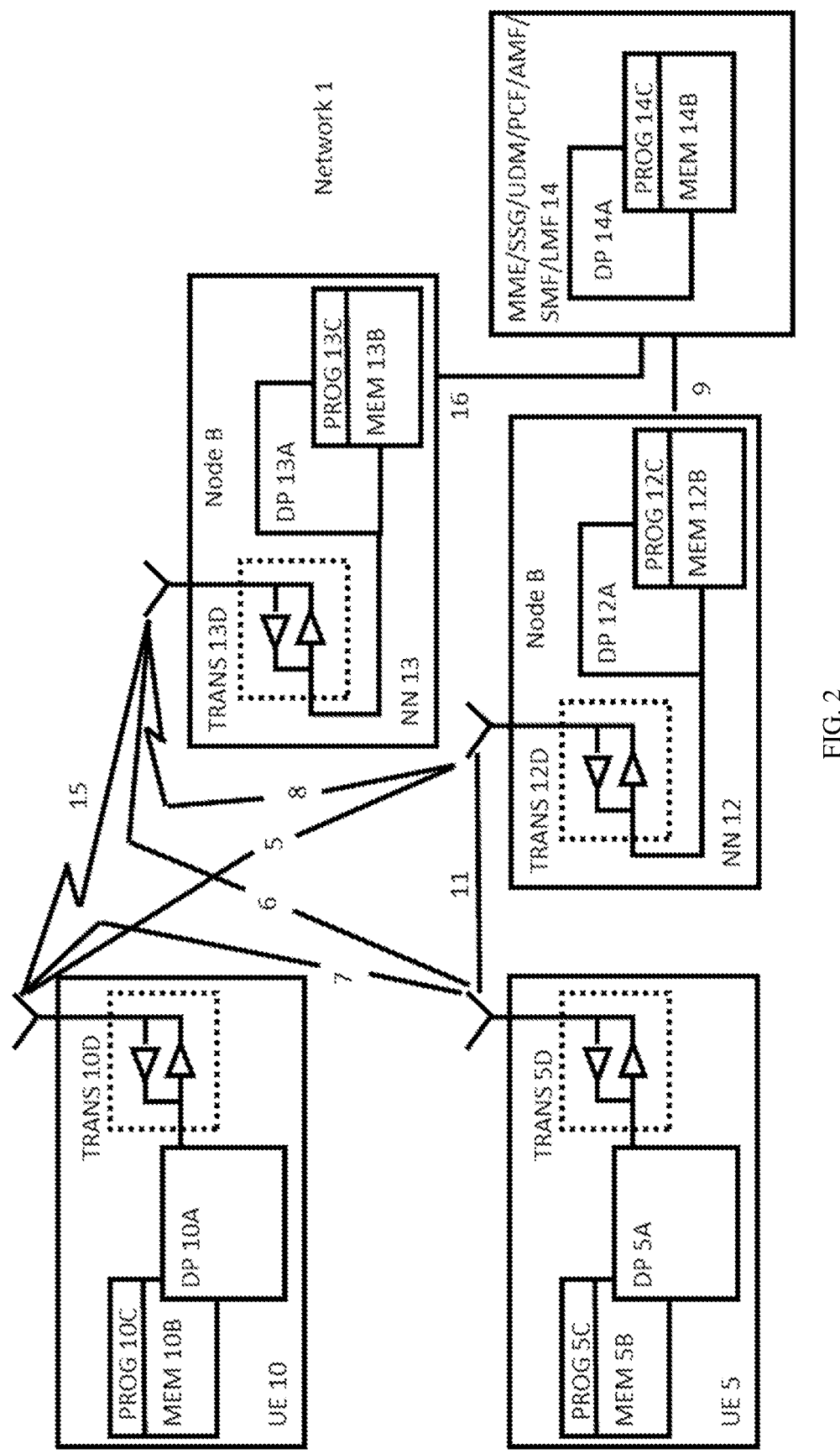
FIG. 2 shows a high level block diagram of various devices used in carrying out various aspects of the invention.

Before describing the example embodiments of the present disclosure in detail, reference is made to FIG. 2 for illustrating a simplified block diagram of various electronic devices of one possible and non-limiting exemplary system that are suitable for use in practicing the example embodiments of the present disclosure.

FIG. 2 shows a block diagram of one possible and non-limiting exemplary system in which the example embodiments of the present disclosure may be practiced. In FIG. 2, a user equipment (UE) 10 and a user equipment (UE) 5 is in wireless communication with a wireless network 1 or network 1 as in FIG. 2. The wireless network 1 or network 1 as in FIG. 2 can comprise a communication network such as a mobile network e.g., the mobile network 1 or first mobile network as disclosed herein. Any reference herein to a wireless network 1 as in FIG. 2 can be seen as a reference to any wireless network as disclosed herein. Further, the wireless network 1 as in FIG. 2 can also comprises hardwired features as may be required by a communication network. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 5 (user equipment 5) includes one or more processors DP 5A, one or more memories MEM 5B, and one or more transceivers TRANS 5D interconnected through one or more buses. Each of the one or more transceivers TRANS 5D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 5D which can be optionally connected to one or more antennas for communication to NN 12 and NN 13, respectively. The one or more memories MEM 5B include computer program code PROG 5C. The UE 5 communicates with NN 12 and/or NN 13 via a wireless link 1 land link 6, respectively. The one or more memories MEM 5B and the computer program code PROG 5C are configured to cause, with the one or more processors DP 5A, the UE 5 to perform one or more of the operations as described herein.

The UE 10 (user equipment 10) includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D which can be optionally connected to one or more antennas for communication to NN 12 and NN 13, respectively. The one or more memories MEM 10B include computer program code PROG 10C. The UE 10 communicates with NN 12 and/or NN 13 via a wireless link 5 and wireless link 15, respectively. The one or more memories MEM 10B and the computer program code PROG 10C are configured to cause, with the one or more processors DP 10A, the UE 10 to perform one or more of the operations as described herein.

The NN 12 (NR/5G Node B, an evolved NB, NR/5G device or LTE device) is a network node such as a master or secondary node base station (e.g., for NR or LTE long term evolution) that communicates with devices such as NN 13, UE 5, and/or UE 10 of FIG. 2. The NN 12 provides access to wireless devices such as the UE 5 and/or the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn and/or other interfaces for use to perform the example embodiments of the present disclosure. Each of the one or more transceivers TRANS 12D includes a receiver and a transmitter. The one or more transceivers TRANS 12D can be optionally connected to one or more antennas for communication over at least link 11 and/or link 5 and/or link 8. The TRANS 12D can connect with the UE 5 and/or UE 10 via links 11 or link 5, respectively. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13 such as via link 8. Further any of the links as disclosed herein may be wired or wireless or both. Further any of the links as disclosed herein may be configured to be through other network devices such as, but not limited to an SGW/AMF/ UPF device such as the MME/SGW/UDM/PCF/AMF/SMF/ LMF 14 of FIG. 2. The NN 12 may perform functionalities of a Mobility Management Entity (MME), Serving Gateway (SGW), Unified Data Management (UDM), Policy Control Function (PCF), User Plane Function (UPF), Access and Mobility Management Function (AMF) and/or a Location Management function (LMF) for LTE and similar functionality for 5G.

The NN 13 (NR/5G Node B, an evolved NB, NR/5G device or LTE device) is also a network node such as a master or secondary node base station (e.g., for NR or LTE) that communicates with devices such as NN 12, UE 5, and/or UE 10 of FIG. 2. The NN 13 can be associated with a mobility function device such as an AMF or SMF, further the NN 13 may comprise a NR/5G Node B or possibly an evolved NB, a base station such as a master or secondary node base station (e.g., for NR or LTE) that communicates with devices such as the NN 12 and/or UE 5 and/or UE 10 in the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces and/or other interfaces for use to perform the example embodiments of the present disclosure. Each of the one or more transceivers TRANS 13D includes a receiver and a transmitter that can optionally be connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with the UE 10 and/or the UE 5 or any other device using, e.g., at least link 15 and/or link 6. The link 8 as shown in FIG. 2 can be used for communication between the NN12 and the NN13. It is noted that any of the link as disclosed herein can comprise one or more links. In addition, any of these links.

It is noted that that the NN 12 and/or the NN 13 can be configured (e.g. based on standards implementations etc.) to perform functionality of a Location Management Function (LMF). The LMF functionality may be embodied in either of the NN 12 or NN 13 or may be part of these network devices or other devices associated with these devices. In addition, an LMF such as the LMF of the MME/SGW/UDM/PCF/ AMF/SMF/LMF 14 of FIG. 2, as at least described below, can be co-located with the NN 12 and/or NN 13 such as to be separate from the NN 12 and/or NN 13 of FIG. 2 for performing operations in accordance with example embodiments of the invention as disclosed herein.

These links, for instances, links 5, 6, 7, 8, 11, 15, 16, and 9 may be wired or wireless or both and the links and/or other interfaces such as being shown in FIG. 2 or FIG. 6 may implement Xn/X2 e.g., link 8 between the NN 12 and the NN 13 can include an X2/Xn interface type link. Further, as stated above any of these links may be through other network devices such as, but not limited to an MME/SGW device such as the MME/SGW/UDM/PCF/AMF/SMF/LMF 14 of FIG. 2. The MME/SGW/UDM/PCF/AMF/SMF/LMF 14 of FIG. 2 may be used to control any functions of any of the devices of the Network 1 as shown in FIG. 2.

The one or more buses of the device of FIG. 2 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D, TRANS 5D, and/or TRANS 10D may be implemented as a remote radio head (RRH), with the other elements of the NN 12 being physically in a different location from the RRH, and one or more buses could be implemented in part as fiber optic cable to connect the other elements of the NN 12 to a RRH for example.

It is noted that although FIG. 2 shows a network nodes Such as NN 12 and NN 13. Any of these nodes may can incorporate or be incorporated into an eNodeB or eNB or gNB such as for LTE and NR, and would still be configurable to perform example embodiments of the present disclosure.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 or any network it can represent may or may not include a MME/SGW/UDM/PCF/AMF/ SMF/LMF 14 that may include Mobility Management Entity (MME), and/or Serving Gateway (SGW), and/or Unified Data Management (UDM), and/or Policy Control Function (PCF), and/or Access and Mobility Management Function (AMF), and/or Session Management Function (SMF), and/or Authentication Server Function (AUSF) and/ or Location Management Function (LMF) and which provides connectivity with a further network, such as a telephone network and/or a data communications network (e.g., the Internet), and which is configured to perform any 5G and/or NR operations in addition to or instead of other standards operations at the time of this application. The MME/SGW/UDM/PCF/AMF/SMF/LMF 14 is configurable to perform operations in accordance with example embodiments of the present disclosure in any of an LTE, NR, 5G and/or any standards based communication technologies being performed or discussed at the time of this application. In addition, it is noted that the operations in accordance with example embodiments of the present disclosure, as performed by the NN 12 and/or NN 13, may also be performed at the MME/SGW/UDM/PCF/AMF/SMF/LMF 14.

Regarding the LMF functionality of the MME/SGW/ UDM/PCF/AMF/SMF/LMF 14 of FIG. 2, the LMF receives measurements and assistance information from the communication network and user equipment (UE). This can be via an Access and Mobility Management Function (AMF) over an interface to determine a position of the UE. The UE 5 and/or the UE 10 as in FIG. 2 may communicate with the LMF via at least any of links 5, 6, 11, and/or 15. The NN 12 and/or NN13 can if necessary then further communicate with the LMF of the MME/SGW/UDM/PCF/AMF/SMF/ LMF 14 of FIG. 2 via the link 16 or link 9 as in FIG. 2.

It is noted that the link 16 or link 9 can include any links needed between UE 5, UE 10, NN 12, and/or NN 13 and the MME/SGW/UDM/PCF/AMF/SMF/LMF 14 of FIG. 2 for any of these devices to communicate with at least the LMF of the MME/SGW/UDM/PCF/AMF/SMF/LMF 14 of FIG. 2. Further, it is noted that any of links that are mentioned in this paper can include hardwired links and/or wireless links and, as needed, and/or include any type of interface (e.g., LTE and/or 5G interface) such as but not limited to at least one of an Xn, X2, S1, NG, NG-C, NLs, E1, and/or F1 type interface.

The MME/SGW/UDM/PCF/AMF/SMF/LMF 14 includes one or more processors DP 14A, one or more memories MEM 14B, and one or more network interfaces (N/W I/F(s)), interconnected through one or more buses coupled with at least links 16 and 9. Communication between the NN 12 or NN 13 and the LMF may be performed via an Access and Mobility Management function (AMF) e.g., of the MME/SGW/UDM/PCF/AMF/SMF/LMF 14. A control plane interface between NN 12 and/or NN 13 (or a gNB) and AMF can be an NG-C interface and an interface between the AMF and LMF can be NLs. In accordance with the example embodiments these network interfaces can include X2 and/or Xn and/or other interfaces for use to perform the example embodiments of the present disclosure. The one or more memories MEM 14B include computer program code PROG 14C. The one or more memories MEM 14B and the computer program code PROG 14C are configured to, with the one or more processors DP 14A, cause the MME/SGW/UDM/PCF/AMF/SMF/LMF 14 to perform or work with the NN 12 or NN 13 to perform one or more operations which may be needed to support the operations in accordance with the example embodiments of the present disclosure.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, DPSA, and/or DP14A and memories MEM 10B, MEM 12B, MEM 13B, MEM 5B, and/or MEM 14B, and also such virtualized entities create technical effects.

The computer readable memories MEM 12B, MEM 13B, MEM 5B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, MEM 5B, and MEM 14B may be means for performing storage functions. The processors DP10, DP12A, DP13A, DPSA, and DP14A may be of any type suitable to the local technical environment, and may include one or more of general-purpose computers, special purpose computers, microprocessors, digital signal processors (DSPs) and processors based on a multi-core processor architecture, as non-limiting examples. The processors DP10, DP12A, DP13A, DPSA, and DP14A may be means for performing functions, such as controlling the UE 10, UE 5, NN 12, NN 13, and other functions as described herein.

In general, various embodiments of the UE 5 and/or UE 10 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Further, the various embodiments of UE 5 or UE 10 can be used with a UE vehicle, a High Altitude Platform Station, or any other such type node associated with a terrestrial network or any drone type radio or a radio in aircraft or other airborne vehicle. The UE 5 or UE 10 can be an anchor UE or a target UE in accordance with example embodiments of the invention.

Such example embodiments of the invention provide at least the following changes in NTWK-A operation to enable NTWK-B idle mode operation or RACH procedure without static reduction of number of carriers.

In accordance with example embodiments of the invention:

MUSIM capable UE indicates the need for capability restriction in a UE Assistance Information message, UAI, indicating a list of restrictions in order of preference. This UAI also includes the cause for the UAI: whether it is meant for connected mode operation or for RACH procedure or IDLE mode operation. In case if it is for idle mode operation, UE may also include gap preference information; and NTWK-A may, depending on its own priority and throughput requirements of ongoing traffic, either release some of the carriers or NTWK-A may create periodic or aperiodic gap on specific secondary carrier for capability sharing. The gap configuration along with secondary carrier index is given in RRC Reconfiguration in this case. This is needed if NTWK-A don't prefer to release carrier completely for the MUSIM operation.

It should be noted that the Gap configuration proposed in in accordance with example embodiments of this invention is different from MUSIM Gap configuration of Rel-17 which was meant to switch the receiver completely between NTWK-A and NTWK-B. Here the gap configuration is carrier specific and for Dual RX/TX architecture and it is meant to share the capability between NTWKs in TDM manner for specific carrier only. From UE perspective, the maximum capability is met in the gap duration as the total carriers in the gap is within the maximum limit with reduced number of carriers in this duration. Further, the gap configuration is for a 'gap for capability sharing'.

Carrier reduction is given here as example to illustrate the concept of 'gap for capability sharing' for Dual RX/TX capable MUSIM UE for DSDA and DSDS operations. It can be generalised for any other resource usage like cell-groups, number of antennas, reference signals measurements, etc.

In accordance with example embodiments of the invention a subscriber UE is indicated by a multi universal subscriber identity module. The subscriber UE can have more than one multi universal subscriber identity module, such that that different subscriptions can be indicated for the UE or for more than one UE. Further, a user equipment can be associated with a plurality of subscriptions, and there can be communicating with a first network via a first subscription of the plurality of subscriptions and communicating with a second network via a second subscription of the plurality of subscriptions.

As stated above, example embodiments of this invention propose applying gaps in one or more carriers—rather than gap in complete RRC connection (Release 17 gaps) or capability reduction—to limit the performance impact on each USIM as much as possible in dualRX/dualTX UEs. The idea makes use of the fact that the UE is dualRX/dualTX, but has still some limitation in terms of max. number of carriers and/or a list of specific frequency band combinations. Hence, the required gap may be a single aperiodic gap which is only needed during a connection setup, if the dualRX/dualTX UE cannot maintain two RRC Connected state only when certain frequency band combination is needed for the operation. In order for the gap to be aligned with the timing corresponding the impacted cell (SCell), the following may be done:

UE reports the timing of gap location with respect to the P-Cell timing in the gap preference provided in UAI;

NTWK, when configuring the gap for specific secondary cell, includes the offset/location as per secondary cell timing.

(In rel-17, configuring gap location different than what UE has given in preference is not possible as it is meant for full receiver sharing).

FIG. 1 illustrates the use of aperiodic carrier specific gap for RACH access (case a) followed by fixed restriction for specific carrier (case b) using the new aspects of the proposed invention.

The description of each step of FIG. 1 is provided in detail in the following:

Step 1&2: UE-1/USIM1 is in RRC_CONNECTED state with NTWK1 using more than one component carrier (primary and secondary cells). UE-2/USIM2 is in RRC_IDLE or RRC_INACTIVE in NTWK2;

Step 3: UE-2/USIM2 intends to establish an RRC connection with NTWK2 and the UE's full capability of dualRX/dualTX is in use by USIM1, so it informs USIM1 that it needs a carrier available to initiate RACH access. This information is exchanged internally in UE between the PS instances corresponding to each USIM;

Step 4: UE-1/USIM1 triggers an UAI requesting an aperiodic gap to NTWK1. This UAI may also include a list of carriers that could be released or where gaps should be created ordered by preference. The preferred list considers UE's band-combo specific limitation, A gap for capability sharing on a specific secondary carrier is received, and the UE capable of operating with two TX/RX chains towards the network ensure that for the given carrier the chain is activated as per the received gap configuration and UE releases or suspend all operation on the carrier where gap was configured;

Step 5: NTWK1 responds to UE-1/USIM1 with RRC-Reconfiguration message indicating the information related to the aperiodic gap in a secondary cell. This could include the carrier to be gapped, along with the gap configuration;

Step 6-8: Gap configuration is forwarded internally in UE to the PS instance corresponding to UE-2/USIM2.

UE-2/USIM2 will then establish an RRC Connection with NTWK-2 which includes RACH and RRC Setup procedure;

Step 9: NTWK2 may remain on the carrier on which the RACH procedure is performed during RRC connection setup or may be moved to a new carrier. The carrier (called C2 here) on which the UE stays in RRC_CONNECTED in NTWK2, has to be released in NTWK1 (if in use). UE-2 provides this information internally to UE-1:

In this step, NTWK2 may switch the UE to different carrier (C3). In this case, step 9 should indicate C3 as carrier to be released in case it is in use;

Step 10: USIM-1 triggers UAI towards NTWK-1 with the release preference. This may include C2, number of cells, and list of secondary cells to be released by order of preference:

If the UE knows the duration of absence or duration of restriction for the connection in other network, it can also provide Timer value for the restriction. In this case network can have conditional configuration linked to timer expiry to add the secondary cell back;

Step 11: NTWK1 sends RRC reconfiguration indicating secondary cell release. This may include a timer and/or conditions for the secondary cell addition, Where step 11 corresponds to the UE indicating a restriction window for release of carrier. In this case the network communicates a radio resource configuration reconfiguration (RRC-Reconfig) for automatic addition of carrier after the window, and a new parameter radio condition is given as additional criteria.

FIG. 3A illustrates operations which may be performed by a device such as, but not limited to, a device (e.g., the UE 5 and/or UE 10 as in FIG. 2). As shown in step 310 of FIG. 3A there is receiving, with a first multi universal subscriber identity module of more than one multi universal subscriber identity module of a first user equipment of a first network, a connection request from a second user equipment of a second network. As shown in step 315 of FIG. 3A there is sending, with the first multi universal subscriber identity module of the first user equipment towards a network node of the first network, assistance information. As shown in step 320 of FIG. 3A wherein the assistance information comprises an indication that the first user equipment needs to leave one carrier of the first network for a multi universal subscriber identity module operation. As shown in step 325 of FIG. 3A in response to the assistance information, receiving from the network node of the first network, a gap configuration for a multi universal subscriber identity module operation. Then as shown in step 330 of FIG. 3A there is, based on the receiving, sending the gap configuration towards the second user equipment for use by the second user equipment to establish a radio resource control connection with the second network.

In accordance with the example embodiments as described in the paragraph above, wherein the assistance information further comprises a list of capability restrictions of the first user equipment in order of preference.

In accordance with the example embodiments as described in the paragraphs above, wherein the first user equipment is the associated with a plurality of subscriptions; there is communicating with the first network via a first subscription of the plurality of subscriptions; and communicating with the second network via a second subscription of the plurality of subscriptions.

In accordance with the example embodiments as described in the paragraphs above, wherein the list of the capability restrictions comprises at least one of a list of carriers that can be released or gaps that can be created ordered by preference.

In accordance with the example embodiments as described in the paragraphs above, wherein the order of preference is based on preference of capability update, release of cells, and activation or deactivation of configured resources for the connection request.

In accordance with the example embodiments as described in the paragraphs above, wherein the assistance information indicates a need for capability restrictions and is requesting a periodic gap or an aperiodic gap to the first network based on the connection request.

In accordance with the example embodiments as described in the paragraphs above, wherein the assistance information further comprises a request for at least one periodic gap or at least one aperiodic gap to the first network based on the connection request.

In accordance with the example embodiments as described in the paragraphs above, wherein there is receiving from the first network a radio resource control reconfiguration indicating a secondary cell release, wherein the radio resource control reconfiguration comprises at least one of a timer or conditions for addition of the secondary cell, and wherein a conditional configuration is linked to timer expiry to add the secondary cell back.

In accordance with the example embodiments as described in the paragraphs above, wherein the first user equipment is in a radio resource control connected state with at least one primary secondary cell of at least one secondary cell group of the first network In accordance with the example embodiments as described in the paragraphs above, wherein the first user equipment has a radio resource control connection using more than one component carrier with secondary cells of the first network.

In accordance with the example embodiments as described in the paragraphs above, wherein the second user equipment is in a radio resource control idle or inactive state with the second network.

In accordance with the example embodiments as described in the paragraphs above, wherein the gap configuration is configuring at least one periodic gap or at least one aperiodic gap used for capability sharing between the first network and the second network on at least one specific secondary carrier for multi-band operation.

In accordance with the example embodiments as described in the paragraphs above, wherein the gap configuration is configuring one or more periodic gaps or one or more aperiodic gaps used for capability sharing between the first network and the second network on at least one secondary carrier for multi-band operation, and wherein the gap configuration is received in a radio resource control reconfiguration message from the first network.

In accordance with the example embodiments as described in the paragraphs above, wherein the gap configuration is carrier specific for the dual connectivity.

In accordance with the example embodiments as described in the paragraphs above, wherein the gap configuration comprises a gap for multi-band operation capability sharing on the at least one specific secondary carrier, and wherein based on the gap configuration the user equipment is capable of operating with two transmit or receive chains towards the network ensuring that for the specific secondary carrier the chain is activated as per the received gap configuration and user equipment one of releases or suspend all operation on the specific secondary carrier where gap was configured.

In accordance with the example embodiments as described in the paragraphs above, there is determining a capability of the list of capability restrictions is met in a gap duration of the gap configuration based on all carriers in the gap being within a maximum limit with a reduced number of carriers in the gap duration.

In accordance with the example embodiments as described in the paragraphs above, wherein the user equipment needs to leave the one carrier of the first network to initiate random access channel access on at least one specific secondary carrier for the multi universal subscriber identity module operation.

In accordance with the example embodiments as described in the paragraphs above, wherein based on the gap configuration the first user equipment is switched by the second network to a different carrier of the second network over which the first user equipment establishes a radio resource control connection with the second network, wherein the different carrier is released in the first network, and wherein the switch and release is indicated to the first user equipment by the second user equipment.

In accordance with the example embodiments as described in the paragraphs above, there is triggering by the first multi universal subscriber identity module, sending information comprising a release preference towards the first network, wherein the information comprises an indication of the different carrier, a number of cells, and a list of secondary cells to be released in order of preference.

In accordance with the example embodiments as described in the paragraphs above, wherein the gap configuration comprises a timer value for duration of absence or restriction for the connection in the first network.

In accordance with the example embodiments as described in the paragraphs above, there is receiving from the first network a radio resource control reconfiguration indicating the different carrier is released in the first network.

A non-transitory computer-readable medium (MEM 5B and/or MEM 10B as in FIG. 2) storing program code (PROG 5C and/or PROG 10C as in FIG. 2), the program code executed by at least one processor (DP 5A and/or DP 10A as in FIG. 2) to perform the operations as at least described in the paragraphs above.

In accordance with an example embodiment of the invention as described above there is an apparatus comprising: means for receiving (TRANS 5D and/or TRANS 10D; MEM 5B and/or MEM 10B; PROG 5C and/or PROG 10C; and DP 5A and/or DP 10A as in FIG. 2), with a first multi universal subscriber identity module of more than one multi universal subscriber identity module of a first user equipment (UE 5 and/or UE 10 as in FIG. 2) of a first network (Network 1 as in FIG. 2), a connection request from a second user equipment of a second network; means for sending (TRANS 5D and/or TRANS 10D; MEM 5B and/or MEM 10B; PROG 5C and/or PROG 10C; and DP 5A and/or DP 10A as in FIG. 2), with the first multi universal subscriber identity module of the first user equipment towards a network node (NN12 and/or NN 13 as in FIG. 2) of the first network, assistance information, wherein the assistance information comprises an indication that the first user equipment needs to leave (TRANS 5D and/or TRANS 10D; MEM 5B and/or MEM 10B; PROG 5C and/or PROG 10C; and DP 5A and/or DP 10A as in FIG. 2) one carrier of the first network for a multi universal subscriber identity module operation; means, in response to the assistance information, for receiving (TRANS 5D and/or TRANS 10D; MEM 5B and/or MEM 10B; PROG 5C and/or PROG 10C; and DP 5A and/or DP 10A as in FIG. 2) from the network node of the first network, a gap configuration for a multi universal subscriber identity module operation; then, based on the receiving, means for sending (TRANS 5D and/or TRANS 10D; MEM 5B and/or MEM 10B; PROG 5C and/or PROG 10C; and DP 5A and/or DP 10A as in FIG. 2) the gap configuration towards the second user equipment for use by the second user equipment to establish a radio resource control connection with the second network In the example aspect of the invention according to the paragraph above, wherein at least the means for receiving, sending, and leaving comprises a non-transitory computer readable medium [MEM 5B and/or MEM 10B] encoded with a computer program [PROG 5C and/or PROG 10C] executable by at least one processor [DP 5A and/or DP 10A].

FIG. 3B illustrates operations which may be performed by a network device such as, but not limited to, a network node NN 12 and/or NN 13 as in FIG. or an eNB or gNB. As shown in step 350 of FIG. 3B there is receiving, by a network node of a first network of a communication network from a first multi universal subscriber identity module of a first user equipment, based on a connection request from a second user equipment of a second network, network assistance information comprising an indication that the first user equipment needs to leave one carrier of the first network for a multi universal subscriber identity module operation. As shown in step 355 of FIG. 3B there is, in response to the assistance information, sending to the user equipment of the first network, a gap configuration for a multi universal subscriber identity module operation. Then in step 360 of FIG. 3B there is, based on the sending, receiving the gap configuration for communicating towards the second user equipment for use by the second user equipment to establish a radio resource control connection with the second network.

In accordance with the example embodiments as described in the paragraph above, wherein the assistance information further comprises a list of capability restrictions of the first user equipment in order of preference.

In accordance with the example embodiments as described in the paragraphs above, wherein the first user equipment is the associated with a plurality of subscriptions for communicating with the first network and communicating with the second network via a second subscription of the plurality of subscriptions.

In accordance with the example embodiments as described in the paragraphs above, wherein the list of the capability restrictions comprises at least one of a list of carriers that can be released or gaps that can be created ordered by preference.

In accordance with the example embodiments as described in the paragraphs above, wherein the order of preference is based on preference of capability update, release of cells, and activation or deactivation of configured resources for the connection request.

In accordance with the example embodiments as described in the paragraphs above, wherein the assistance information indicates a need for capability restrictions and is requesting a periodic gap or an aperiodic gap to the first network based on the connection request.

In accordance with the example embodiments as described in the paragraphs above, wherein the assistance information further comprises a request for at least one periodic gap or at least one aperiodic gap to the first network based on the connection request.

In accordance with the example embodiments as described in the paragraphs above, wherein there is receiving from the first network a radio resource control reconfiguration indicating a secondary cell release, wherein the radio resource control reconfiguration comprises at least one of a timer or conditions for addition of the secondary cell, and wherein a conditional configuration is linked to timer expiry to add the secondary cell back.

In accordance with the example embodiments as described in the paragraphs above, wherein the first user equipment has a radio resource control connection using more than one component carrier with secondary cells of the first network.

In accordance with the example embodiments as described in the paragraphs above, wherein the gap configuration is configuring at least one periodic gap or at least one aperiodic gap used for capability sharing between the first network and the second network on at least one specific secondary carrier for multi-band operation.

In accordance with the example embodiments as described in the paragraphs above, wherein the gap configuration is configuring one or more periodic gaps or one or more aperiodic gaps used for capability sharing between the first network and the second network on at least one secondary carrier for multi-band operation, and wherein the gap configuration is received in a radio resource control reconfiguration message from the first network.

In accordance with the example embodiments as described in the paragraphs above, wherein the gap configuration is carrier specific for the dual connectivity.

In accordance with the example embodiments as described in the paragraphs above, wherein the gap configuration comprises a gap for multi-band operation capability sharing on the at least one specific secondary carrier, and wherein based on the gap configuration the user equipment is capable of operating with two transmit or receive chains towards the network ensuring that for the specific secondary carrier the chain is activated as per the received gap configuration and user equipment one of releases or suspend all operation on the specific secondary carrier where gap was configured.

In accordance with the example embodiments as described in the paragraphs above, wherein the gap configuration caused the first user equipment to determine a capability of the list of capability restrictions is met in a gap duration of the gap configuration based on all carriers in the gap being within a maximum limit with a reduced number of carriers in the gap duration, and wherein the gap configuration causes the first user equipment to leave the one carrier of the first network to initiate random access channel access on at least one specific secondary carrier for the multi universal subscriber identity module operation.

In accordance with the example embodiments as described in the paragraphs above, wherein based on the gap configuration the first user equipment is switched by the second network to a different carrier of the second network over which the first user equipment establishes a radio resource control connection with the second network, wherein the different carrier is released in the first network, and wherein the switch and release is indicated to the first user equipment by the second user equipment.

In accordance with the example embodiments as described in the paragraphs above, there is receiving from a first multi universal subscriber identity module of the first user equipment, information comprising a release preference, wherein the information comprises an indication of the different carrier, a number of cells, and a list of secondary cells to be released in order of preference.

In accordance with the example embodiments as described in the paragraphs above wherein the gap configuration comprises a timer value for duration of absence or restriction for the connection in the first network.

In accordance with the example embodiments as described in the paragraphs above, there is sending towards the first user equipment a radio resource control reconfiguration indicating the different carrier is released in the first network.

A non-transitory computer-readable medium (MEM 12B and/or MEM 13B as in FIG. 2) storing program code (PROG 12C and/or PROG 13C as in FIG. 2), the program code executed by at least one processor (DP 12A and/or DP 13A as in FIG. 2) to perform the operations as at least described in the paragraphs above.

In accordance with an example embodiment of the invention as described above there is an apparatus comprising: means for receiving (TRANS 12D and/or TRANS 13D; MEM 12B and/or MEM 13B; PROG 12C and/or PROG 13C; and DP 12A and/or DP 13A as in FIG. 2), by a network node (NN 12 and/or NN 13 as in FIG. 2) of a first network of a communication network (Network 1 as in FIG. 2) from a first multi universal subscriber identity module of a first user equipment (UE 5 and/or UE 10 as in FIG. 2), based on a connection request from a second user equipment of a second network, network assistance information comprising an indication that the first user equipment needs to leave one carrier of the first network for a multi universal subscriber identity module operation; means, in response to the assistance information, for sending (TRANS 12D and/or TRANS 13D; MEM 12B and/or MEM 13B; PROG 12C and/or PROG 13C; and DP 12A and/or DP 13A as in FIG. 2) to the user equipment of the first network, a gap configuration for a multi universal subscriber identity module operation; the means, based on the sending, for receiving the gap configuration for communicating towards the second user equipment for use by the second user equipment to establish a radio resource control connection with the second network.

In the example aspect of the invention according to the paragraph above, wherein at least the means for receiving and sending comprises a non-transitory computer readable medium [MEM 12B and/or MEM 13B] encoded with a computer program [PROG 12C and/or PROG 13C] executable by at least one processor [DP 12A and/or DP 13A].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:

(a) hardware-only circuit implementations (such as implementations in only analog and/or digital circuitry); and (b) to combinations of circuits and software (and/or firmware), such as (as applicable):

(i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of example embodiments of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:

receiving, with a first multi universal subscriber identity module of more than one multi universal subscriber identity module of a first user equipment of a first network, a connection request from a second user equipment of a second network; sending, with the first multi universal subscriber identity module of the first user equipment towards a network node of the first network, assistance information;

wherein the assistance information comprises an indication that the first user equipment needs to leave one carrier of the first network for a multi universal subscriber identity module operation;

in response to the assistance information, receiving from the network node of the first network, a gap configuration for a multi universal subscriber identity module operation; and based on the receiving, sending the gap configuration towards the second user equipment for use by the second user equipment to establish a radio resource control connection with the second network, wherein the method further comprises:

determining a capability of a list of capability restrictions is met in a gap duration of the gap configuration based on all carriers in the gap being within a maximum limit with a reduced number of carriers in the gap duration, wherein the gap configuration is carrier specific for dual connectivity and identifies a specific secondary cell of the first network on which an aperiodic gap for capability sharing is to be applied;

wherein the gap configuration is received in a radio resource control reconfiguration message and includes a timing indication aligned to a primary cell timing with an offset according to the identified secondary cell; wherein the method further comprises: based on the receiving, forwarding the gap configuration to a protocol stack associated with a second subscription of the user equipment for use by the second subscription to initiate random access and establish the radio resource control connection on a specified carrier of the second network, wherein, based on the gap configuration, the user equipment operates with two transmit or receive chains toward the first network and releases or suspends all operation only on the identified secondary cell where the gap was configured.

2. An apparatus, comprising: at least one processor; and at least one non-transitory memory including computer program code, where the at least one non-transitory memory and more than one multi universal subscriber identity module of the first user equipment, a connection request from a second user equipment of a second network; send, with the first multi universal subscriber identity module of the first user equipment towards a network node of the first network, assistance information, wherein the assistance information indicates a need for capability restrictions and is to the first network based on the connection request; wherein the assistance information comprises an indication that the first user equipment needs to leave one carrier of the first network for a multi universal subscriber identity module operation; the computer program code are configured, with the at least one processor, to cause a first user equipment of a first network to at least: receive, with a first multi universal subscriber identity module of in response to the assistance information, receive from the network node of the first network, a gap configuration for a multi universal subscriber identity module operation; and based on the receiving, send the gap configuration towards the second user equipment for use by the second user equipment to establish a radio resource control connection with the second network, wherein the assistance information further comprises a list of capability restrictions of the first user equipment in order of preference, and wherein the list of the capability restrictions of the first user equipment comprises at least one of a list of carriers that can be released or gaps that can be created ordered by preference, and the order of preference is based on at least one of: preference of capability update, release of cells, or activation or deactivation of configured resources for the connection request, wherein the gap configuration is carrier specific for dual connectivity and identifies a specific secondary cell of the first network on which an aperiodic gap for capability sharing is to be applied; wherein the gap configuration is received in a radio resource control reconfiguration message and includes a timing indication aligned to a primary cell timing with an offset according to the identified secondary cell; wherein the at least one non-transitory memory including the computer program code is configured with the at least one processor to cause the first user equipment to: based on the receiving, forward the gap configuration to a protocol stack associated with a second subscription of the user equipment for use by the second subscription to initiate random access and establish the radio resource control connection on a specified carrier of the second network, wherein, based on the gap configuration, the user equipment operates with two transmit or receive chains toward the first network and releases or suspends all operation only on the identified secondary cell where the gap was configured.

3. The apparatus of claim 2, wherein the first user equipment is associated with a plurality of subscriptions; and wherein the at least one non-transitory memory including the computer program code is configured with the at least one processor to cause the first user equipment to:

communicate with the first network via a first subscription of the plurality of subscriptions; and communicate with the second network via a second subscription of the plurality of subscriptions.

4. The apparatus of claim 2, wherein the assistance information indicates a need for capability restriction and is requesting a periodic gap or an aperiodic gap to the first network based on the connection request.

5. The apparatus of claim 2, wherein the at least one non-transitory memory including the computer program code is configured with the at least one processor to cause the first user equipment to:

receive from the first network a radio resource control reconfiguration indicating a secondary cell release, wherein the radio resource control reconfiguration comprises at least one of a timer or conditions for addition of the secondary cell, wherein a conditional configuration is linked to timer expiry to add the secondary cell back, and wherein a conditional configuration is linked to timer expiry to add the secondary cell back.

6. The apparatus of claim 2, wherein the first user equipment is in a radio resource control connected state with at least one primary secondary cell of at least one secondary cell group of the first network.

7. The apparatus of claim 2, wherein the first user equipment has a radio resource control connection using more than one component carrier with secondary cells of the first network, wherein the second user equipment is in a radio resource control idle or inactive state with the second network.

8. The apparatus of claim 2, wherein at least one of:

the gap configuration configures at least one periodic gap or at least one aperiodic gap used for capability sharing between the first network and the second network on at least one specific secondary carrier for multi-band operation; or the gap configuration configures one or more periodic gaps or one or more aperiodic gaps used for capability sharing between the first network and the second network on at least one secondary carrier for multi-band operation, wherein the gap configuration is received in a radio resource control reconfiguration message from the first network; or the gap configuration is carrier specific for the dual connectivity.

9. The apparatus of claim 8, wherein the gap configuration comprises a gap for multi-band operation capability sharing on the at least one specific secondary carrier, and/or comprises a timer value for duration of absence or restriction for the connection in the first network; and wherein based on the gap configuration, the user equipment is capable of operating with two transmit or receive chains towards the network ensuring that for the specific secondary carrier the chain is activated as per the received gap configuration and the user equipment releases or suspend all operation on the specific secondary carrier where gap was configured.

10. The apparatus of claim 8, wherein the at least one non-transitory memory including the computer program code is configured with the at least one processor to cause the first user equipment to:

trigger by the first multi universal subscriber identity module, sending information comprising a release preference towards the first network, wherein the information comprises an indication of a different carrier, a number of cells, and a list of secondary cells to be released in order of preference.

11. The apparatus of claim 2, wherein the at least one non-transitory memory including the computer program code is configured with the at least one processor to cause the first user equipment to:

determine a capability of a list of capability restrictions is met in a gap duration of the gap configuration based on all carriers in the gap being within a maximum limit with a reduced number of carriers in the gap duration.

12. The apparatus of claim 2, wherein the user equipment needs to leave the one carrier of the first network to initiate random access channel access on at least one specific secondary carrier for the multi universal subscriber identity module operation.

13. The apparatus of claim 2, wherein based on the gap configuration the first user equipment is caused to be switched by the second network to a different carrier of the second network over which the first user equipment establishes a radio resource control connection with the second network, wherein a different carrier is released in the first network, and wherein the indication to the first user equipment to switch and release is obtained from the second user equipment.

14. The apparatus of claim 2, wherein the at least one non-transitory memory including the computer program code is configured with the at least one processor to cause the first user equipment to:

receive from the first network a radio resource control reconfiguration indicating a different carrier is released in the first network.

* * * * *